United States Patent [19]

Esmond

[11] 4,054,527
[45] Oct. 18, 1977

[54] COUNTERCURRENT CAPILLARY TRANSFER DEVICE

[76] Inventor: William G. Esmond, 800 Country Club Road, Havre de Grace, Md. 21078

[21] Appl. No.: 699,850

[22] Filed: June 25, 1976

[51] Int. Cl.² .......................................... B01D 31/00
[52] U.S. Cl. .................................. 210/321 B; 210/456
[58] Field of Search ..................... 210/22, 23 H, 23 F, 210/321 R, 321 A, 321 B, 456

[56] References Cited

U.S. PATENT DOCUMENTS

| | | | |
|---|---|---|---|
| 3,169,112 | 2/1965 | Nelson | 210/456 X |
| 3,485,902 | 12/1969 | Critchell | 210/22 X |
| 3,490,523 | 1/1970 | Esmond | 210/321 B X |
| 3,498,909 | 3/1970 | Littman | 210/321 R X |
| 3,560,340 | 2/1971 | Leonard | 210/22 X |
| 3,701,431 | 10/1972 | Brown et al. | 210/321 R |
| 3,956,449 | 5/1976 | Wexler et al. | 210/321 A X |

*Primary Examiner*—Wilbur L. Bascomb, Jr.
*Assistant Examiner*—Robert H. Spitzer
*Attorney, Agent, or Firm*—Diller, Brown, Ramik & Wight

[57] ABSTRACT

A capillary mass transfer device suitable for use as an artificial kidney or an artificial lung and includes a plurality of capillary tubes through which blood or other liquid to be treated may flow. The capillary tubes are carried by perforated supports which define passages in which the capillary tubes are disposed and through which a second fluid (dialysate) flows. The tubes are arranged in sets which are readily positioned within a split housing in a manner wherein the transfer device may be quickly and economically assembled.

10 Claims, 5 Drawing Figures

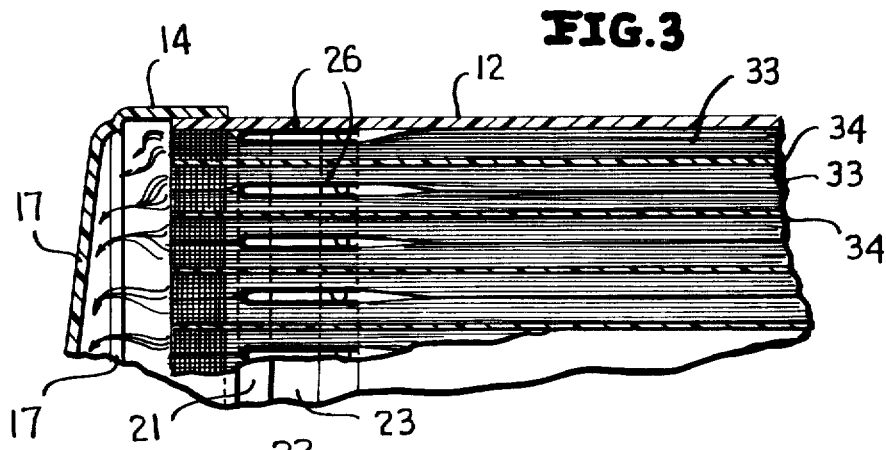
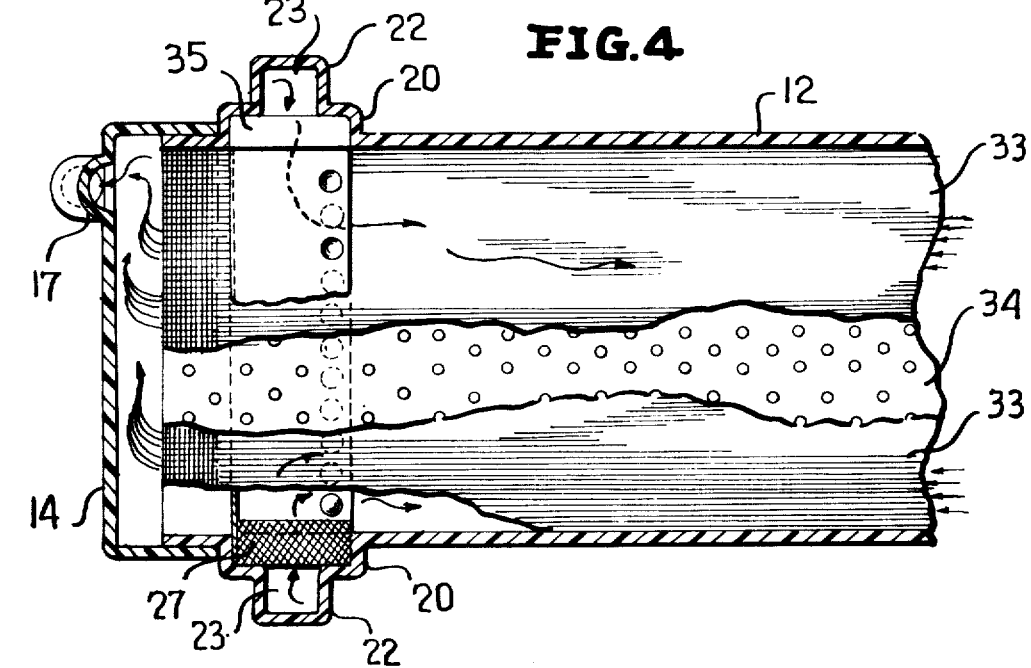
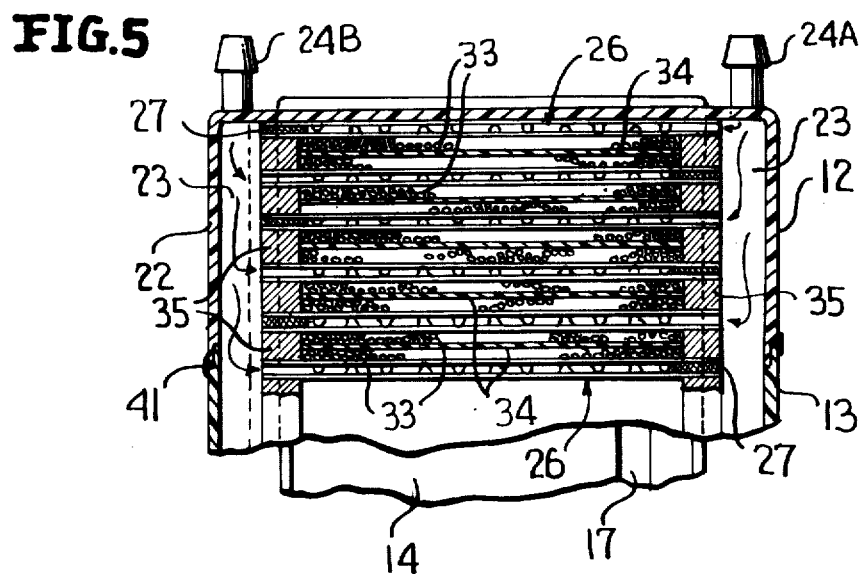

COUNTERCURRENT CAPILLARY TRANSFER DEVICE

This invention relates in general to new and useful improvements in transfer devices, and more particularly to a transfer device utilizing capillary tubes for the flow of the liquid to be treated. This application is directed to an improvement of the invention disclosed and claimed in my copending application Ser. No. 596,501, filed July 16, 1975.

In the past, capillary tubes or hollow fibers have been utilized in transfer devices. However, difficulties have been encountered in obtaining not only the orderly flow of a liquid to be treated therethrough, but also in the flowing of the necessary transfer fluid around such tubes.

In my prior application, I have solved this general flow problem by providing countercurrent flow passages around the capillary tubes. However, the manner in which the capillary tubes and flow passage defining members are assembled is more time consuming than desired.

In accordance with this invention, there has been provided a very effective arrangement of capillary tubes, support sheets, and precision countercurrent flow means which, together with a split housing formed of identical halves, permits the ready assembling of the various components. In accordance with this invention, the components may be assembled in each of the housing halves, and then two housing halves, full of components, may then be joined together.

Other features of the invention include specific construction of the housing which permits the necessary flow passages to be formed therein, and special precision flow distribution channels which are cooperative with the split housing in a novel manner to permit the ease of assembling of the components while assuring proper countercurrent fluid flow.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is an elongated fragmentary longitudinal vertical sectional view taken along the line 3—3 of FIG. 1 and shows the specific internal construction of the transfer device.

FIG. 4 is an enlarged fragmentary horizontal sectional view taken along line 4—4 of FIG. 1 and shows further the arrangement of fluid flow through the transfer device.

FIG. 5 is an enlarged fragmentary transverse vertical sectional view taken along the line 5—5 of FIG. 1 and shows the arrangement of the various components within the split housing.

Figure 1:
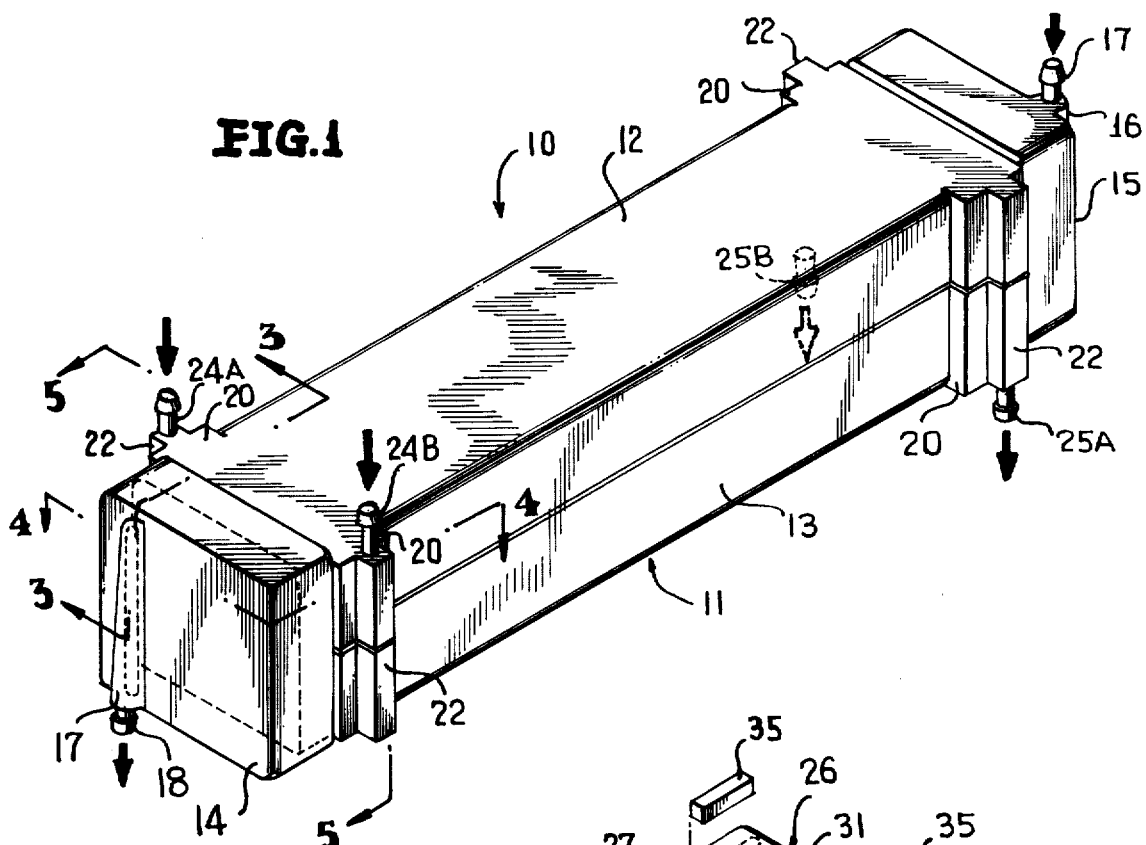
FIG. 1 is a perspective view of the transfer device of this invention.
Figure 2:
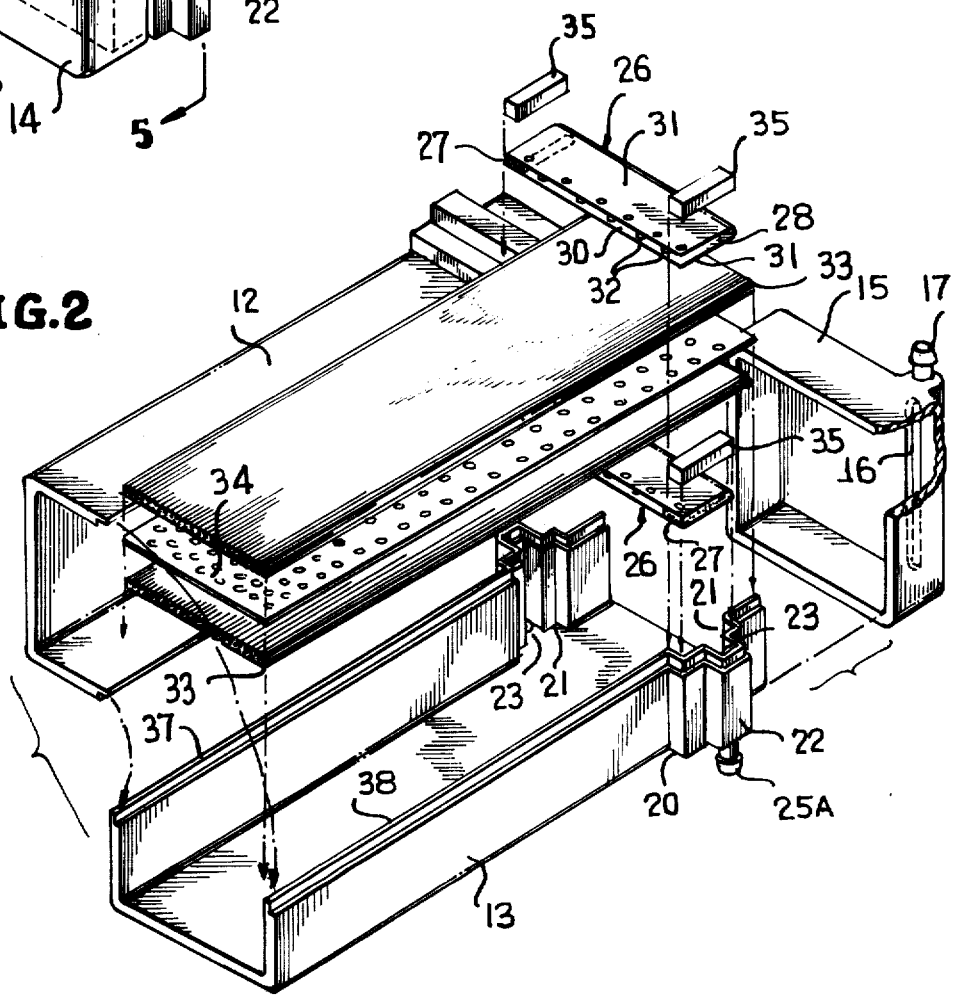
FIG. 2 is an exploded fragmentary perspective view of the transfer device of FIG. 1 showing the various components thereof.

Referring now to the drawings in detail, it will be seen that the transfer device, which is generally identified by the numeral 10, includes a special housing, generally identified by the numeral 11. The housing 11 is preferably formed of plastics materials which are compatible with blood and is of a longitudinally split construction, including two identical housing halves 12 and 13. The halves 12 and 13 have open ends which are closed by identical caps 14 and 15 which are telescoped with respect to the ends of the housing halves 12, 13.

The end caps 14, 15 function as manifold members for the liquid or fluid to be treated and, in accordance with further description of this invention, the end cap 15 is provided with a manifold portion 16 having an inlet fitting 17 associated therewith. In a like manner, the end cap 14 has a manifold portion 16 having associated therewith an outlet fitting 18.

Adjacent each end thereof, each housing half 12, 13 is provided with transversely aligned, outwardly projecting ribs 22 which in turn define narrower channels 23 which open outwardly from the channels 21. The channels 23 selectively define passages for a second liquid or fluid (the dialysate). It will be apparent from FIG. 1 that there are four ribs 22 on the housing 11 and of these four ribs, only two are necessarily functional, with the functional ribs 22 being diagonally disposed with respect to one another and the functional rib 22 disposed adjacent the end cap 14 being provided with an inlet fitting, such as fitting 25A while the functional rib 22 disposed adjacent the end cap 15 is provided with an outlet fitting, such as fitting 25A.

The flow means of the transfer device 10 also includes distribution members generally identified by the numeral 26. Each distribution member 26 is in the form of a flat channel member having two end openings 28 and one side opening. One of the end openings of the distribution member 26 is closed by means of a suitable plug 27. Thus flow through the distribution member 26 is through the opposite end openings 28 and the side opening, identified by the numeral 30.

The channel shaped distribution member 26 is preferably formed of sheet material which is bent to the illustrated flat configuration. A preferred material is stainless steel although other materials may be utilized. In order to prevent the collapse of the flanges of the channel member which forms the distribution member 26, thereby restricting the height of the edge opening, the flanges, which are identified by the numeral 31, have adjacent the edge opening 30 inwardly directed projections 32 of a height corresponding to the height of the edge or side opening.

The transfer device 10 further includes sets of capillary tubes 33. Each set of capillary tubes includes a central support 34, which may be in the form of a perforated sheet or a screen having on opposite sides thereof a plurality of rows of the capillary tubes 33. The rows of the capillary tubes 33 may be bonded to the various supports 34 to form the sets in advance of assembly or may be assembled as the transfer device 10 is assembled.

At this time, it is pointed out that the sheet 34 is preferably formed of perforated plastics fiber material although perforated metal foil could be utilized. The plastics material, when the transfer device is to be utilized in conjunction with blood, must be compatible with blood and is preferably a polycarbonate or MYLAR. The capillary tubes, in a like manner, must be compatible with blood and must have the capability of permitting maximum dialytic transfer of toxins therethrough, without allowing leakage of blood proteins or blood cells. The tubes should not be permeable to bacteria or viruses. It has been found that suitable plastics materials include cellulose, cellulose acetate, polycarbonate and polyacrylonitrile. It is to be understood that the capillary tubes 33 are in the form of hollow fibers and preferably have a hole size on the order of 200 microns.

It is to be understood that each of the sheets 34 has a width and length corresponding to the internal width and length of the housing halves 12, 13 and that the tubes 33 are substantially the same length as the support 34. Further, the width of each set of tubes, which includes the support 34 and the plurality of rows of tubes 33 on opposite sides thereof, will be one so as to be snugly received in the respective housing half.

It is to be understood that the distribution members 26 are of a length and width so that the ends thereof are snugly received within the channels 21, as is best shown in FIG. 4. The distribution members 26 are positioned within the housing halves with the orientation thereof being such that the open ends 28 thereof are associated with the active channels 23.

The transfer device is assembled by first preassembling tubes 33 to both sides of the supports 34. A fluid distribution member 26 is placed on each end of the housing half 13 so that one distribution member 26 opens to the right hand side of the housing and the second fluid distribution member 26 opens to the left hand side of the housing half 13 on the opposite end. The ends of each fluid distribution member 26 is seated in a respective slot 21 and the members are suitably sealed relative to the housing half 13. A preassembled pair of tube sheets with the support screen in the center is then positioned and cemented on top of the two fluid distribution members. A spacer 35 is set on top of each end portion of each fluid distribution member 26 on each side of the set of tubes in the slots 21 and suitably sealed. A second pair of fluid distribution members 26 are next cemented in the grooves 21 one on each end of the housing half but with opposite orientation, i.e., each fluid distribution member 26 having its open end on the opposite side of the housing with respect to the first pair. A second preassembled pair of tube sets and support screen is next cemented on top of the second pair of fluid distribution members 26, together with spacers 35, thus completing one assembly module. A number of assembly modules are cemented in place until housing half 13 is filled. The second housing half 12 is assembled in an identical manner except that the fluid distribution members 26 are reversed. Each housing is filled so that half the thickness of one additional fluid distribution member 26 is reserved in each of the housing halves 12, 13. Before final assembly of the halves, two fluid distribution members 26 are cemented into the assembled lower half and then the upper half of the assembly is cemented to the lower half. The protruding ends of the potted dialysis tubes are then carefully cut off flush with the ends of the housing halves 12, 13 as is shown in FIG. 3.

At this time it is pointed out that each of the housing halves 12, 13, have stepped free edges 37, 38 which are dissimilar but so associated wherein the housing halves 12, 13 may be identical and two of the housing halves may mate together. A suitable sealing material is utilized to join together the housing halves 12, 13, as shown in FIG. 5 and identified by the numeral 41.

The end caps 14, 15 are, of course, assembled last and are also suitably sealed with respect to the housing halves 12, 13 so as to make a seal unit except for the inlet and outlet fittings described above.

From the foregoing, it will be readily apparent that the transfer device 10 may be readily assembled and that the required seal between the liquid or fluid to be treated and the treating liquid or fluid may be readily effected.

OPERATION

As will be apparent from the foregoing description of the components of the transfer device 10, blood or other liquid to be treated is directed into the end cap 15 through the inlet fitting 17 and the manifold 16 and this liquid freely flows into the adjacent ends of the capillary tubes 33. The fluid or liquid to be treated flows out of the other ends of the capillary tubes 33 into the end cap 14 and therefrom through the manifold 17 and the outlet fitting 18.

The treating liquid or fluid is directed into the housing 11 through the inlet fitting 24A and into the associated channel 23 with the treating liquid or fluid then flowing into the open ends of the distribution members 26 associated therewith in the manner best illustrated in FIG. 4. The treating liquid or fluid flowing out of each distribution member 26 circulates around and longitudinally of the respective group of capillary tubes 33 which are bounded by the two adjacent supports 34 with the flow of the treating liquid or fluid being counter to that of the liquid or fluid passing through the capillary tubes 33.

The treating liquid or fluid passes from left to right within the housing 11, as viewed in FIG. 1, and at the right hand end of each group of capillary tubes 33, is received within the opposing distribution member 26 and flows through the distribution member 26 to an associated one of the channels 23 to discharge the treating liquid or fluid through the outlet fitting 25A. It will be readily apparent that fluid entering into the housing 11 through the inlet fitting 24 will flow only into those of the distribution members 26 which have their open ends 28 opening into the associated channels 23 and that the flow will not only be countercurrent to the flow through the tubes 33, but also diagonally across the tubes in view of the relative diagonal positions of the inlet fitting 24A and the outlet fitting 25A.

It is also to be noted that the housing 11 is provided with an inlet fitting 24B and an outlet fitting 25B, which fittings are also in diagonal relationship. The inlet fitting 24B feeds the others of the distribution member 26 which open into their respective ones of the channels 23 so that there is not only countercurrent flow and flow across the two bundles, but also criss-crossing flow. This provides for a maximum mixing efficiency resulting in the highest possible efficiency in any such countercurrent flow exchange device.

It will be readily apparent that all of the components of the transfer device 10 are relatively simple in construction and that they need to be quickly and easily assembled. Thus, there is provided a transfer device having a high capacity which can be economically produced and which is constructed to convey the liquid or fluid to be treated at a low pressure so as to be readily suitable for use with human blood as an artificial kidney or an artificial lung.

Although only a preferred embodiment of the transfer device has been specifically illustrated and described herein, it is to be understood that minor variations may be made in the transfer device without departing from the spirit and scope of the invention, as defined by the appended claims.

I claim:

1. A countercurrent capillary transfer device comprising a plurality of capillary tubes, first flow means connected to said tubes for directing a first fluid through said tubes in a first direction, and second flow means associated with said tubes externally thereof for directing a second fluid externally surrounding said tubes in a second and opposite direction, and a sealed housing having flow means for said fluids forming portions of said first and second flow means, said housing including split identically formed halves arranged in mirror image relation, said housing halves including outwardly directed ribs forming flow channels, which flow channels form parts of said first flow means, each of said ribs forming an outward extension of a wider rib defining a socket, said sockets being transversely aligned adjacent opposite ends of said housing halves, and said first flow means including distribution members extending transversely of said tubes and having end portions seated in said sockets.

2. The transfer device of claim 1 wherein said distribution members are in the form of channels and are arranged in opposed pairs opening towards one another.

3. The transfer device of claim 1 wherein said distribution members are arranged in opposed pairs spaced longitudinally of said tubes, and there being supports between said tubes dividing said tubes into groups with each group being associated with a pair of distribution members.

4. The transfer device of claim 1 wherein said tubes are arranged in sets, and said first flow means include a pair of distribution members between each tube set, said distribution members extending transversely of said tubes with distribution members of each set being longitudinally spaced and opening towards one another.

5. The transfer device of claim 4 wherein each of said sets of tubes includes a support screen with certain of said tubes of each set being arranged on opposite sides of said support.

6. The transfer device of claim 1 wherein each distribution member is in the form of a flat sheet material channel having end and edge openings, means plugging one of said end openings whereby flow through said channel is through the other of said end openings, and said channel has means for preventing the collapse thereof to restrict said edge opening.

7. A countercurrent capillary transfer device comprising a plurality of capillary tubes; a sealed housing surrounding said tubes, said housing having first flow means connected to interiors of said tubes for directing a first fluid through said tubes in a first direction, and second flow means connected to said tubes externally thereof for selectively directing a second fluid externally surrounding said tubes in two opposite and diagonally crossing directions; said tubes being arranged in sets, said second flow means including a pair of distribution members between each tube set, said distribution members extending transversely of said tubes, with distribution members of each set being longitudinally spaced and opening towards one another, each of said sets of tubes including a perforated support with certain of said tubes of each set being arranged on opposite sides of said support.

8. The transfer device of claim 7 with each distribution member being in the form of a flat sheet material channel having end and edge openings, means plugging one of said end openings whereby flow through said channel is through the other of said end openings, and said channel having means for preventing the collapse thereof to restrict said edge opening.

9. A countercurrent capillary transfer device comprising a plurality of capillary tubes arranged in stacked spaced layers, a housing enclosing said layers of tubes, first flow means carried by said housing and connected to said tubes for directing a first fluid through said tubes in a first direction, and second flow means carried by said housing and associated with said tubes externally thereof for directing a second fluid externally of said tubes in a second and opposite direction, said second flow means including flow divider means for effecting a separate second fluid flow between each adjacent pair of layers of tubes, said second flow means including diagonally positioned inlets and outlets for providing second fluid flow diagonally across each layer of tubes with second fluid flows between adjacent layers of tubes being in crossing relation.

10. The transfer device of claim 9 wherein said layer of tubes includes two layer sets disposed on opposite sides of a central support.

* * * * *